(12) United States Patent
Blake et al.

(10) Patent No.: US 10,303,864 B2
(45) Date of Patent: May 28, 2019

(54) CONTINUOUS USER AUTHENTICATION TOOL FOR MOBILE DEVICE COMMUNICATIONS

(71) Applicant: INTERNATIONAL BUSINESS MACHINES CORPORATION, Armonk, NY (US)

(72) Inventors: William H. Blake, Colorado Springs, CO (US); Gregory J. Boss, Saginaw, MI (US); Rhonda L. Childress, Austin, TX (US); William A. Lemke, Scarsdale, NY (US); Kevin C. McConnell, Austin, TX (US); Jeffrey D. Schaefer, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 15/172,333

(22) Filed: Jun. 3, 2016

(65) Prior Publication Data
US 2017/0193211 A1    Jul. 6, 2017

Related U.S. Application Data

(63) Continuation of application No. 14/986,674, filed on Jan. 2, 2016, now Pat. No. 9,392,460.

(51) Int. Cl.
*H04W 8/18* (2009.01)
*G06F 21/32* (2013.01)
(Continued)

(52) U.S. Cl.
CPC ............ *G06F 21/32* (2013.01); *G06F 21/316* (2013.01); *H04L 63/0861* (2013.01);
(Continued)

(58) Field of Classification Search
USPC .......................................................... 726/17
See application file for complete search history.

(56) References Cited

U.S. PATENT DOCUMENTS

| 4,805,222 A * | 2/1989 | Young ................... | G06F 21/316 |
| | | | 382/115 |
| 6,697,947 B1 | 2/2004 | Matyas, Jr. et al. | |

(Continued)

FOREIGN PATENT DOCUMENTS

| EP | 2458524 A1 | 5/2012 |
| WO | 2012051680 A1 | 11/2012 |

(Continued)

OTHER PUBLICATIONS

NPL—Aug. 2012 (Year: 2012).*
(Continued)

*Primary Examiner* — Taghi T Arani
*Assistant Examiner* — Badridot Champakesanatusptodotgov
(74) *Attorney, Agent, or Firm* — Weitzman Law Offices, LLC (57) ABSTRACT

A user authentication tool continuously authenticates the user of a computing device during an electronic communication session. A trusted user profile includes keypad pressure applied by the trusted user when depressing characters on a virtual keypad displayed on the computing device touch screen. Keypad pressure applied by the current user of the computing device is continually monitored during the current electronic communication session. The monitored keypad pressure applied by the current user is compared to the keypad pressure in the trusted user profile. A confidence score is generated based upon the compared keypad pressures of the current user and the trusted user, the confidence score being indicative of the likelihood that the current user is the trusted user of the computing device. The computing (Continued)

device is automatically required to re-authenticate the current user as the trusted user if the generated confidence score is below a predefined minimum confidence threshold.

18 Claims, 7 Drawing Sheets

(51) Int. Cl.
| | | |
|---|---|---|
| H04W 12/06 | (2009.01) | |
| H04L 29/08 | (2006.01) | |
| H04M 1/725 | (2006.01) | |
| H04W 4/029 | (2018.01) | |
| H04L 29/06 | (2006.01) | |
| G06F 21/31 | (2013.01) | |

(52) U.S. Cl.
CPC ............. *H04L 67/04* (2013.01); *H04L 67/12* (2013.01); *H04L 67/18* (2013.01); *H04L 67/22* (2013.01); *H04L 67/306* (2013.01); *H04M 1/72552* (2013.01); *H04W 4/029* (2018.02); *H04W 8/183* (2013.01); *H04W 12/06* (2013.01); *G06F 2221/2111* (2013.01); *H04M 1/72572* (2013.01)

(56) References Cited

U.S. PATENT DOCUMENTS

| | | |
|---|---|---|
| 7,509,686 B2 | 3/2009 | Checco |
| 8,345,829 B2 | 1/2013 | Kim et al. |
| 8,447,272 B2 | 5/2013 | Faith et al. |
| 8,713,645 B2 | 4/2014 | Deluca et al. |
| 8,838,071 B1 | 9/2014 | Boss et al. |
| 8,843,754 B2 | 9/2014 | Alward et al. |
| 8,886,166 B2 | 11/2014 | Fratti et al. |
| 8,892,461 B2 | 11/2014 | Lau et al. |
| 8,943,561 B2 | 1/2015 | Foster et al. |
| 8,966,602 B2 | 2/2015 | Ghandi et al. |
| 9,053,307 B1 | 6/2015 | Johansson et al. |
| 9,077,749 B2 | 7/2015 | Guo et al. |
| 9,392,460 B1* | 7/2016 | Blake ................ H04W 4/029 |
| 2002/0188854 A1* | 12/2002 | Heaven ................ G06F 21/10 713/186 |
| 2008/0148393 A1* | 6/2008 | Wendt ................ G06F 21/32 726/19 |
| 2009/0240949 A9 | 9/2009 | Kitchens et al. |
| 2009/0278792 A1 | 11/2009 | Toebes et al. |
| 2010/0146619 A1* | 6/2010 | Chen ................ G06F 21/32 726/19 |
| 2010/0225443 A1 | 9/2010 | Bayram et al. |
| 2011/0050394 A1 | 3/2011 | Zhang et al. |
| 2011/0050576 A1 | 3/2011 | Forutanpour et al. |
| 2012/0204257 A1 | 8/2012 | O'Connell et al. |
| 2013/0042111 A1 | 2/2013 | Fiske |
| 2013/0055348 A1* | 2/2013 | Strauss ................ G06F 21/31 726/3 |
| 2013/0089763 A1 | 3/2013 | Lee et al. |
| 2013/0133055 A1 | 5/2013 | Ali et al. |
| 2013/0167207 A1* | 6/2013 | Davis ................ G06F 21/316 726/5 |
| 2013/0347099 A1 | 12/2013 | Smith |
| 2014/0007223 A1 | 1/2014 | Han et al. |
| 2014/0137191 A1 | 5/2014 | Goldsmith et al. |
| 2014/0188770 A1 | 7/2014 | Agrafioti et al. |
| 2014/0181933 A1 | 9/2014 | Jamshidi-Roudbari et al. |
| 2014/0267108 A1* | 9/2014 | Chung ................ G06F 3/044 345/173 |
| 2014/0274159 A1 | 9/2014 | Bernheim Brush et al. |
| 2014/0282868 A1* | 9/2014 | Sheller ................ G06F 21/31 726/3 |
| 2014/0300554 A1 | 10/2014 | Samuel et al. |
| 2014/0366148 A1 | 10/2014 | Schwartz |
| 2014/0366158 A1 | 12/2014 | Han et al. |
| 2014/0379431 A1 | 12/2014 | Kritt et al. |
| 2015/0065085 A1 | 3/2015 | Sheikh Naziruddin et al. |
| 2015/0082273 A1 | 3/2015 | Torok et al. |
| 2015/0169854 A1 | 6/2015 | Chang et al. |
| 2015/0213244 A1* | 7/2015 | Lymberopoulos ...... G06F 21/32 726/18 |
| 2015/0213245 A1* | 7/2015 | Tartz ................ G06F 21/83 726/17 |
| 2015/0242605 A1* | 8/2015 | Du ................ G06F 21/32 726/7 |
| 2015/0369854 A1 | 12/2015 | Sheller et al. |
| 2016/0034046 A1* | 2/2016 | Waddell ................ G06F 3/0237 345/173 |
| 2016/0034682 A1 | 2/2016 | Fiske |
| 2016/0050217 A1* | 2/2016 | Mare ................ H04L 9/3215 726/4 |
| 2016/0065570 A1 | 3/2016 | Spencer, III et al. |
| 2016/0202834 A1* | 7/2016 | Jiang ................ H04M 1/72569 345/173 |
| 2016/0205094 A1* | 7/2016 | Harthattu ................ H04W 4/02 455/411 |
| 2017/0126879 A1* | 5/2017 | Krishna ................ G06F 21/31 |
| 2017/0185287 A1* | 6/2017 | Unruh ................ G06F 3/04886 |
| 2018/0129413 A1* | 5/2018 | Berger ................ G06F 3/04886 |

FOREIGN PATENT DOCUMENTS

| | | |
|---|---|---|
| WO | 20140205148 A1 | 12/2014 |
| WO | 20150088537 A1 | 6/2015 |

OTHER PUBLICATIONS

WM-CS—Jun. 2012 (Year: 2012).*
Yap et al., "Physical Access Protection using Continuous Authentication," Proc 2008 IEEE Conf. on Technologies for Homeland Security, pp. 510-512 (2008).
Abstract of I. Trarore et al., "Continuous Authentication using Biometrics: Data, Models and Metrics," (IGI Global 1st ed. (Sep. 30, 2011), at the http://www.amazon.com/Continuous-Authentication-Using-Biometrics-Metrics/dp/1613501293 (downloaded on Oct. 5, 2015).

* cited by examiner

CONTINUOUS USER AUTHENTICATION TOOL FOR MOBILE DEVICE COMMUNICATIONS

CROSS REFERENCE TO RELATED APPLICATION

This application is a continuation of U.S. patent application Ser. No. 14/986,674, filed Jan. 2, 2016, the entirety of which is incorporated herein by reference.

BACKGROUND

This disclosure relates to user authentication, and more specifically, to a continuous user authentication tool and computer-implemented method for verifying the identity of a user of a mobile device during an electronic communication session.

The use of near real-time electronic communication, such as (but not limited to) text messaging (e.g., short message service (SMS), multimedia messaging service (MMS), enhanced messaging service (EMS), etc.), instant messaging (IM) and internet relay chat (IRC), is commonplace throughout much of the world. Indeed, with nearly 2 trillion text messages annually in the United States and nearly 7.5 trillion worldwide, electronic communication has become a routine part of everyday life in industrialized countries. An electronic communication, such as a text message, is typically directed to a recipient's mobile computing device, such as a smart phone, tablet and other handheld computing devices.

A challenge associated with near real-time electronic communication systems is that participants in the electronic communication session cannot be assured of the true identity of the other participants with whom they are communicating. Instead, each participant generally assumes that he is communicating with a trusted and known individual(s) with whom the participant associates with the mobile device(s) to which the communications are directed. Many mobile devices, however, do not have adequate security to prevent unauthorized use if the mobile device is lost, stolen or otherwise picked up by an unknown person. While some mobile devices are password protected in an effort to prevent unauthorized access to the mobile device, passwords may be stolen and techniques exist to bypass or reveal the password on the mobile device. Furthermore, if a mobile device is being used by an unknown person with the owner's consent, a participant transmitting an electronic communication to the borrowed mobile device would not know that he is not communicating with the trusted and known individual with whom the participant associates the borrowed mobile device. In each of these circumstances, an unknown person who has gained access to the mobile device would appear to other participants in an electronic communication session directed to that mobile device as the trusted and known user.

SUMMARY

According to one aspect of this disclosure, a continuous user authentication tool for near real-time electronic communications, including a computing device associated with a trusted user, the computing device including a pressure-sensitive touch screen and at least one processing unit coupled to non-transient memory and the pressure-sensitive touch screen. The pressure-sensitive touch screen is configured to generate a signal representing keypad pressure applied by a user when depressing a character on a virtual keypad displayed on the touch screen. A trusted user profile is stored in non-transient memory, the trusted user profile including data representing the keypad pressure applied by the trusted user when depressing one or more characters on the virtual keypad. A continuous user authentication application, stored in non-transient memory, that, when executed by the at least one processing unit during a current near real-time electronic communication session, causes the at least one processing unit to continually monitor keypad pressure applied by a current user of the computing device when depressing characters on the virtual keypad to type an electronic communication during the current electronic communication session. The monitored keypad pressure applied by the current user when depressing one or more specific characters on the virtual keypad is compared to the trusted user profile data representing the keypad pressure applied by the trusted user to the specific one or more characters. A confidence score is generated based upon the compared keypad pressures of the current user and the trusted user, the confidence score being indicative of the likelihood that the current user is the trusted user of the computing device. The computing device is automatically required to re-authenticate the current user as the trusted user if the generated confidence score is below a predefined minimum confidence threshold.

According to another aspect of this disclosure, a computer-implemented method for continuously authenticating a user of a computing device during a near real-time electronic communication session, includes storing, using at least one processing unit operatively coupled to non-transient memory, a profile of a trusted user of the computing device in non-transient memory, the trusted user profile including data representing keypad pressure applied by the trusted user when depressing one or more characters on a virtual keypad displayed on a pressure-sensitive touch screen of the computing device. Keypad pressure applied by a current user of the computing device when depressing characters on the virtual keypad to type an electronic communication during a current near real-time electronic communication session is continually monitored, using the at least one processing unit. The monitored keypad pressure applied by the current user when depressing one or more specific characters on the virtual keypad is compared, using the at least one processing unit, to the trusted user profile data representing the keypad pressure applied by the trusted user to the specific one or more characters. The computing device is automatically required, using the at least one processing unit, to re-authenticate the current user as the trusted user if the compared keypad pressures of the current user and the trusted user are indicative of the likelihood that the current user is not the trusted user of the computing device.

DETAILED DESCRIPTION

The following detailed description refers to the accompanying drawings. The same labels and/or reference numbers in different drawings may identify the same or similar elements.

Aspects of this disclosure include a system, tool and computer-implemented method for continuously authenticating the identity of a user of a mobile device during a near real-time electronic communication session to verify that such electronic communications are with the trusted user (e.g., the owner) associated with the mobile device. Near real-time electronic communications include (but are not limited to) text messaging (e.g., short message service (SMS), multimedia messaging service (MMS), enhanced messaging service (EMS), etc.), instant messaging (IM), and Internet relay chat (IRC). It is understood, however, that this disclosure is not limited to the above-identified message protocols, and virtually any other message protocol using a mobile device may be employed in accordance with this disclosure.

Figure 1:
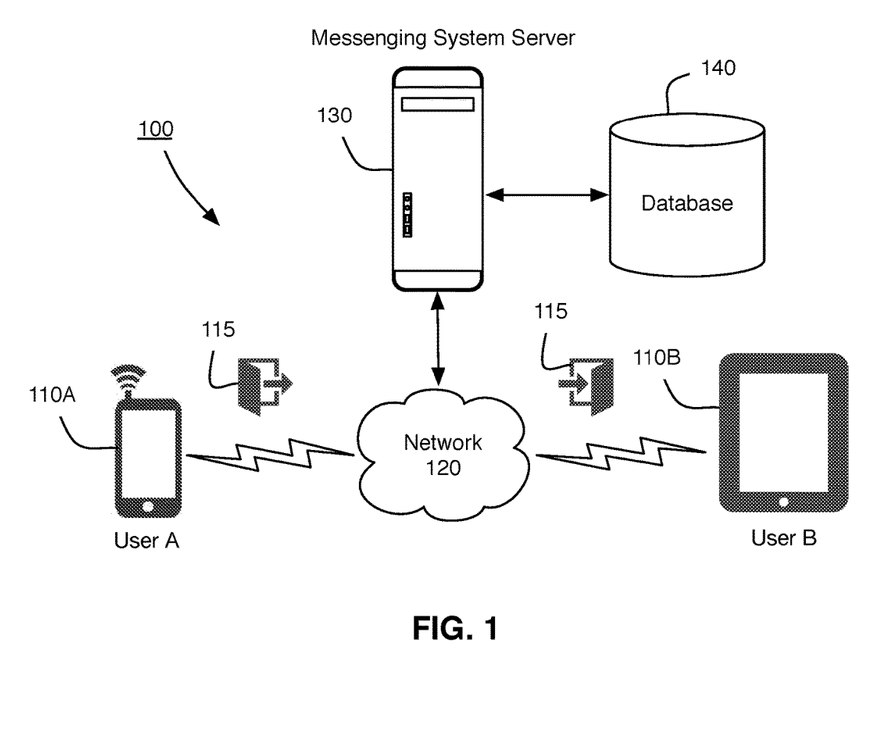
FIG. 1 is an illustrative network environment in which a system for continuous authentication of the identity of participants in an electronic communication session may be implemented.

FIG. 1 illustrates a representative network environment 100 in which the system, tool and computer-implemented method for continuous authentication of the identity of participants in a near real-time electronic communication session may be implemented. As shown in FIG. 1, two or more users employing mobile computing devices 110A, 110B (hereinafter collectively referred to as "mobile device 110") communicate over network 120. Network 120 may be a wide area network (WAN) such as the Internet, the Public Switched Telephone Network (PSTN), a local area network (LAN), an intranet, an extranet, a cellular network, any wired or wireless network, or any combination of the above that will support near real-time electronic communication 115 between mobile devices 110.

The mobile device(s) 110 may be, for example, a smart phone, tablet computer, personal digital assistant (PDA), laptop computer, or any other computing device capable of accepting user input and transmitting/receiving near real-time electronic communications 115 (e.g., text messages, IMs, IRCs, etc.) over network 120.

For illustration purposes only, FIG. 1 shows User A utilizing mobile device 110A to communicate with User B utilizing mobile device 110B over network 120. In this illustrative example, User A is shown using a smart phone 110A, such as (but not limited to) an iPhone® or Android® handheld device, and User B is shown using a tablet 110B, such as (but not limited to) an iPad® or Windows® Surface® tablet computer. It is understood, however, that mobile devices 110A, 110B may be any mobile computing device capable of accepting user input and transmitting/receiving near real-time electronic communications 115 over network 120. In addition, although only two users and two mobile devices 110A, 110B are shown in FIG. 1, it is understood that environment 100 may include any number of mobile devices and/or other communication computing devices, each controlled by a respective user. It is also understood that the system and computer-implemented method can be implemented to continuously authenticate the identity of the user of mobile device 110 during near real-time electronic communication sessions between the mobile device 110 and a non-mobile communication computing device, such as (but not limited to) a desktop computer, server, or other computer system.

The mobile devices 110A, 110B communicate with one or more messaging system servers 130 over network 120. The messaging system server 130 receives near real-time electronic communications 115 transmitted from a mobile device 110 and forwards the received electronic communications to the destination mobile device (or other communication computing devices). For example, in one embodiment, if User A sends a text message 115 on mobile device 110A addressed to mobile device 110B (destination mobile device), the text message may be transmitted over network 120 to messaging system server 130. Messaging system server 130 receives the transmitted text message 115 and preferably stores the text message in database 140. The messaging system server 130 preferably looks up information stored in database 140 to identify and locate the destination mobile device 110B within network 120. The messaging system server 130 then routes the text message 115 over network 120 to the destination mobile device 110B. In the example of a SMS text message, the messaging system server 130 may be a short message center (SMC) or a mobile switching center (MSC), and database 140 may be a home location register (HLR), visitor location register (VLR), or combination HLR/VLR. As is known in the art, a HLR is the main database in a mobile network containing information of the subscription profile of the mobile device and routing information for where the mobile device is currently located in the network 120. Similarly, a VLR contains temporary information about a mobile device in the network 120, such as the mobile device identification (MIN, MSIN, etc.) and current location within the network 120.

Figure 2:
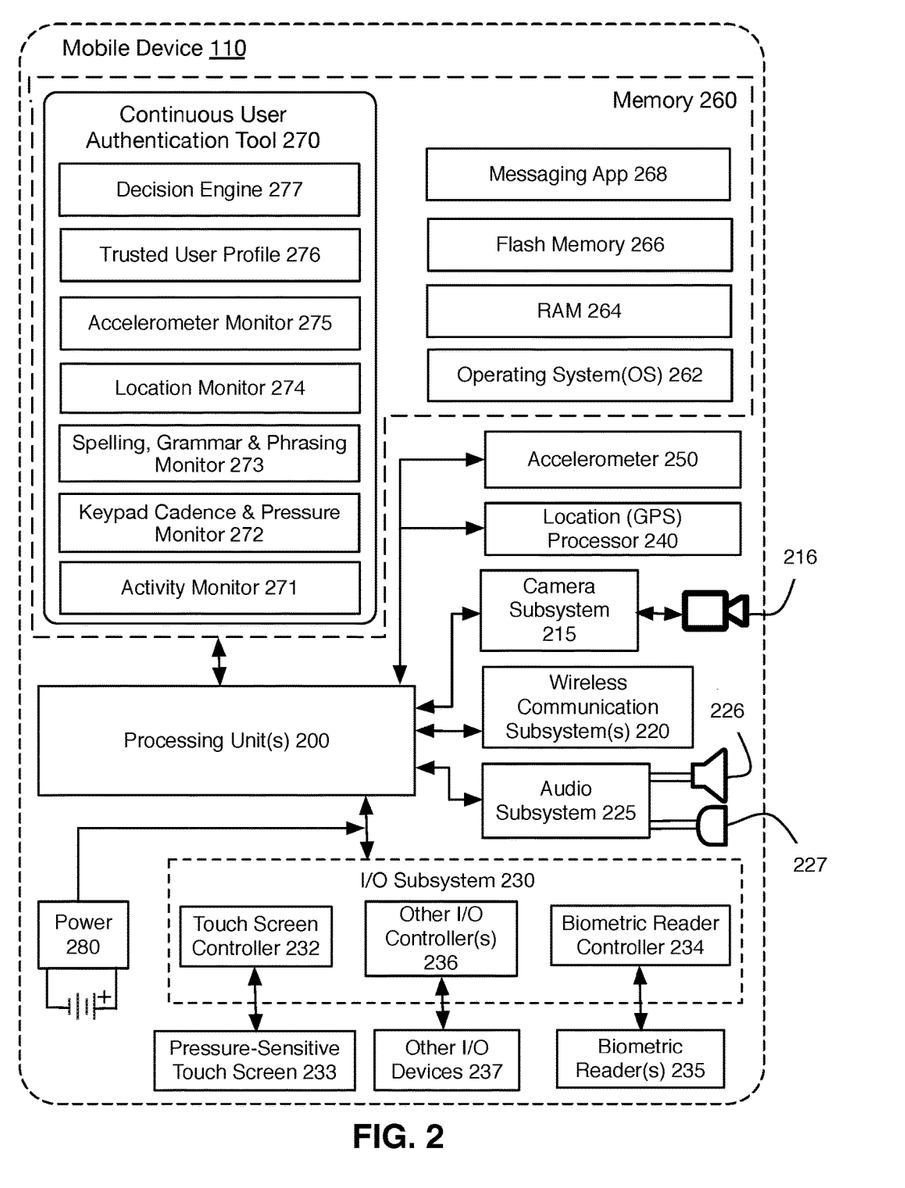
FIG. 2 is a block diagram of an illustrative mobile computing device that may be utilized to implement the various features and processes described herein.

FIG. 2 is a block diagram of an illustrative mobile device 110. As discussed above, examples of mobile computing devices 110 include (but are not limited to) smart phones, tablet computers, personal digital assistants (PDAs), laptop computers, or any other computing devices capable of accepting user input and transmitting/receiving near real-time electronic communications 115 (e.g., text messages, IMs or IRCs) over network 120. As shown, the mobile device 110 includes one or more processing units 200 coupled to system memory 260, and various sensors and subsystems including (but not limited to) camera subsystem 215, wireless communication subsystem(s) 220, audio subsystem 225, I/O subsystem 230, power subsystem 280, etc.

For example, as shown in FIG. 2, the processing unit(s) 200 communicates with various peripherals on mobile device 110, such as (but not limited to) location (GPS) processor 240 and acceleration sensor 250 (e.g., an accelerometer). The processing unit(s) 200 may also communicate with other peripherals on mobile device 110, such as an orientation sensor (e.g., a gyroscope), proximity sensor, light sensor, motion sensor, magnetometer, etc.

Camera subsystem 215 is coupled to one or more optical sensors 216 (e.g., a charged coupled device (CCD) optical sensor, a complementary metal-oxide-semiconductor (CMOS) optical sensor, etc.), to facilitate camera functions, such as image and/or video data capturing. In some embodiments, camera subsystem 215 may be used to provide an image of the user of mobile device 110 for a facial recognition application (not shown) executed by processing unit(s) 200.

Wireless communication subsystem 220 facilitates mobile device communication functions over network 120. For example, wireless communication subsystem 220 may include one or more transmitters and receivers (not shown), which are implemented to operate over network 120.

Audio subsystem 225 is coupled to speaker(s) 226 to output audio and to microphone 227 to facilitate voice-enabled functions, such as voice recognition, digital recording, etc. In some embodiments, audio subsystem 225 can be used to provide a voiceprint of the user of mobile device 110 for a voiceprint recognition application (not shown) executed by processing unit(s) 200.

I/O subsystem 230 facilitates the transfer between I/O peripheral devices, such as (but not limited to) a pressure-sensitive touch screen 233, biometric inputs 235, etc., and the data bus of the processing unit(s) 200. I/O subsystem 230 includes a touch screen controller 232, a biometric reader controller 234, and other I/O controller(s) 236 to facilitate the transfer between I/O peripheral devices and the data bus of processing unit(s) 200. As shown in FIG. 2, touch screen controller 232 is coupled to the pressure-sensitive touch screen 233 to detect contact and movement on the touch screen 233 using any of multiple touch sensitivity technologies. In some embodiments, touch screen controller 232 also detects touch pressure (e.g., the amount of force) being applied to touch screen 233 by a user of mobile device 110, such as when the user is typing on a virtual keypad displayed on the touch screen. This can be accomplished, for example, by measuring changes in capacitance between a conductive material deposited on the touch screen 233 and various circuit elements of the touch screen. The change in capacitance can be correlated to the amount of force applied by the user of mobile device 110 to the touch screen 233. One example of a mobile device 110 that measures the force applied by a user on a touch screen is the 3D Touch™ technology in the iPhone® 6s and iPhone® 6s Plus, which utilizes capacitive sensors (e.g., strain gauges) embedded in the touch screen to measure the force the user is applying on the touch screen.

Biometric reader controller 234 is coupled to biometric reader(s) 235 to detect biometric input to the biometric reader 235 using any of multiple different biometric reading technologies. For instance, biometric reader(s) 235 may be (but is not limited to) a thumbprint and/or fingerprint reader, an iris scanner, a voiceprint reader, etc., or a combination of the above. The other input controller(s) 236 are coupled to other I/O devices 237.

The processing unit(s) 200 is coupled to system memory 260, which stores various software components or applications to be executed by processing unit(s) 200. Preferably, memory 260 stores an operating system (OS) 262, which includes various procedures, sets of instructions, software components and/or drivers for controlling and managing general system tasks (e.g., memory management, storage device control, power management, etc.) and facilitates communication between various hardware and software components. System memory 260 also preferably includes RAM 264 and non-volatile flash memory 266, a combination of volatile/non-volatile memory, and/or any other type of memory.

System memory 260 also includes communication instructions to facilitate communicating with one or more additional devices; graphical user interface (GUI) instructions to facilitate GUI processing; image processing instructions to facilitate image-related processing and functions; input processing instructions to facilitate input-related (e.g., touch input, biometric input) processes and functions; audio processing instructions to facilitate audio-related processes and functions; camera instructions to facilitate camera-related processes and functions; and biometric verification instructions to facilitate the verification of biometric data. It is understood that the communication instructions described above are merely exemplary and the system memory 260 may also include additional instructions. For example, memory 260 for a smartphone 110 may include phone instructions to facilitate phone-related processes and functions. It is also understood that the above-mentioned instructions need not be implemented as separate software programs or modules.

System memory 260 also includes a messaging application 268, which enables a user of mobile device 110 to transmit and receive near real-time electronic communications, such as (but not limited to) text messages, IMs and IRCs, over network 120.

Memory 260 also includes a continuous user authentication tool 270, which, when executed by the processing unit(s) 200, preferably runs in background on mobile device 110 to continuously monitor use of the mobile device during an electronic messaging session. The continuous user authentication tool 270 includes one or more of the following applications that may be executed by processing unit(s) 200: activity monitor 271; keypad cadence and pressure monitor 272; spelling, grammar and phrasing monitor 273; location monitor 274; and accelerometer monitor 275. Although shown separately in FIG. 2, it is understood that monitors 271-275 need not be implemented as separate software programs or modules.

The activity monitor 271 is a software application that, when executed by the processing unit(s) 200, measures and tracks general user activity on mobile device 110 during a near real-time electronic communication session. For example, the activity monitor 271 monitors the time following the last communication during the session and, if the time exceeds a pre-defined or user-defined period, the activity monitor will identify the session as interrupted, stopped or completed. If communications during the session are interrupted, stop or appear to be finished, then the activity monitor 271 recognizes subsequent communications as having a slightly higher chance of being performed by a different user on mobile device 110. This information is preferably used as one of the inputs to calculate a confidence score regarding whether the current user of the mobile device 110 participating in an electronic communication session is the trusted user associated with the mobile device.

The keypad cadence and pressure monitor 272 is a software application that, when executed by the processing unit(s) 200, measures keypad biometrics and/or typing dynamics (e.g., typing rate, characteristics of the typing speed, and/or keypad (key press) pressure) of a user typing on a virtual keypad displayed on the pressure-sensitive touch screen 233 on mobile device 110. Measurements may include (but are not limited to) typing speed, speed between various characters depressed on the keypad of touch screen 233, duration of time that the user holds down or depresses a particular letter, pressure on each letter, time required to type a particular word, time to type specific combinations of letters in a particular word, etc. By way of example only, if a user of mobile device 110 typed the word "The" on touch screen 233, the keypad cadence and pressure monitor 272 could measure data specific to the user as to: (1) the time for the user to type the entire word "THE"; (2) the length of time each individual letter in the word "THE" was depressed by the user; (3) the amount of pressure applied by the user on each letter in the word "THE"; and/or (4) the time for the user to type specific combinations of letters in the word (e.g., the time to type the letters "T" and "H" and/or the letters "H" and "E"). This information is used to create a profile for a trusted user (e.g., owner) of mobile device 110 from the perspective of typing (keypad) cadence and keypad pressure, which can be compared to a current user of the mobile device 110 to authenticate whether the current user is the trusted user of the mobile device.

The spelling, grammar and phrasing monitor 273 is a software application that, when executed by processing unit(s) 200, characterizes a user of mobile device 110 based on patterns of spelling, grammar, phrasing and/or usage of acronyms while typing on a virtual keypad displayed on the touchscreen 233 of the mobile device during a near real-time electronic communication session. The spelling, grammar and phrasing monitor 273 identifies specific patterns of spelling, grammar, phrasing and/or acronyms that are common to the user of the mobile device 110. These patterns may be, for example, how the user typically spells a particular word (e.g., "Theater" vs. "Theatre") and/or whether the user typically types the full word or uses an acronym (e.g., "Thanks" vs. "Thx"; "Got to go" vs. "GTG"; "Talk to you later" vs. "TTYL"; etc.). This information is used to create a profile for a trusted user (e.g., owner) of mobile device 110, which is compared to a current user of the mobile device 110 to authenticate whether the current user is the trusted user of the mobile device.

The location monitor 274 is a software application that, when executed by the processing unit(s) 200, determines the geographic location of mobile device 110 during a near real-time electronic communication session. A profile for a trusted user of mobile device 110 may be created by capturing the GPS coordinates of the mobile device, using, for example, the location (GPS) processor 240, where the user is normally located at that time of day and/or day of the week. For example, if the current GPS coordinates of the mobile device 110 being monitored are significantly different from the trusted user's historical GPS coordinates of that mobile device at that time and day of the week, then such change in location may be indicative of suspicious activity (e.g., that the user of mobile device 110 may not be the trusted user of the device). Similarly, if a user of the mobile device 110 being monitored was, according to location (GPS) processor 240, in a first location and, a short time later is in a second location remote from the first location, then the location monitor 273 will classify this change as being indicative of suspicious activity (e.g., that the user of mobile device 110 may not be the trusted user of the device).

The accelerometer monitor 275 is a software application that, when executed by the processing unit(s) 200, reads data from accelerometer 250 to determine whether the mobile device 110 is stationary or moving during a near real-time electronic communication session. For instance, the accelerometer monitor 275 can monitor whether the mobile device 110 has been placed on a flat surface and how long it has been there, and whether the mobile device 110 is traveling at a high rate of speed (indicative of the user of the mobile device being in a car or other vehicle). A profile of a trusted user of mobile device 110 may be created by collecting data regarding the time of day and day of the week when the trusted user participates in electronic communication sessions on mobile device 110 and whether the mobile device is stationary or moving. For example, if the trusted user of mobile device 110 routinely participates in electronic communication sessions while commuting on a train to work, then use of the mobile device 110 during an electronic communication session while the device is monitored as moving during the normal commuting time would be an indicator that the current user of the mobile device is the trusted user of that device.

Data associated with the activity monitor 271, keypad cadence and pressure monitor 272, spelling, grammar and phrasing monitor 273, location monitor 274, and accelerometer monitor 275 may be stored in system memory 260 of the mobile device 110 or in memory (e.g., one or more databases or other storage) that is accessible by processing unit(s) 200 of mobile device 110. This data may be accessed by the processing unit(s) 200 to create and store a trusted user profile 276 for the trusted user (e.g., owner) of mobile device 110.

As will be discussed in detail below, processing unit(s) 200 execute a primary decision engine component 277 to continuously compare (real-time or near real-time) data being monitored by the monitors 271-275 during a current electronic communication session with the stored trusted user profile 276 associated with that mobile device 110 to determine whether the current user of the mobile device 110 is the trusted user associated with that mobile device. In some embodiments, the decision engine component 277 running on processing unit(s) 200 uses the data to calculate an overall confidence score as to the probability that the current user of mobile device 110 is the trusted user associated with that mobile device. This confidence score can be compared to a predefined acceptable minimum confidence threshold for purposes of authenticating the current user of mobile device 110.

While the components illustrated in FIG. 2 are shown as separate components, one of ordinary skill in the art will recognize that two or more components or modules may be integrated into a single component or module. In addition, two or more components may be coupled together by one or more communication buses or signal lines. Also, while many of the functions have been described as being performed by one component or module, one of ordinary skill in the art will realize that the functions described with respect to FIG. 2 may be split into two or more components or modules.

The mobile device 110 also includes one or more power source(s) 280 for powering the various hardware components of the mobile device. Power source 280 may include a power management system, one or more power sources, a recharging system, a power failure detection circuit, a power converter or inverter, a power status indicator, and any other components typically associated with the generation, management and distribution of power in mobile devices.

In another embodiment, the decision engine component 277 and trusted user profile 276 may be incorporated within a remote computing system/server (not shown) that receives, processes and stores data being monitored by the monitors 271-275 of mobile device 110. This data may be transmitted by mobile device 110 over network 120 to the remote computing system/server, which would create the trusted user profile 276 and execute the decision engine 277 to continuously compare the monitored data received from the mobile device 110 during a current electronic communication session with the stored trusted user profile 276 associated with that mobile device 110 to determine whether the current user of the mobile device 110 is the trusted user (e.g., owner) associated with that mobile device.

Figure 3:
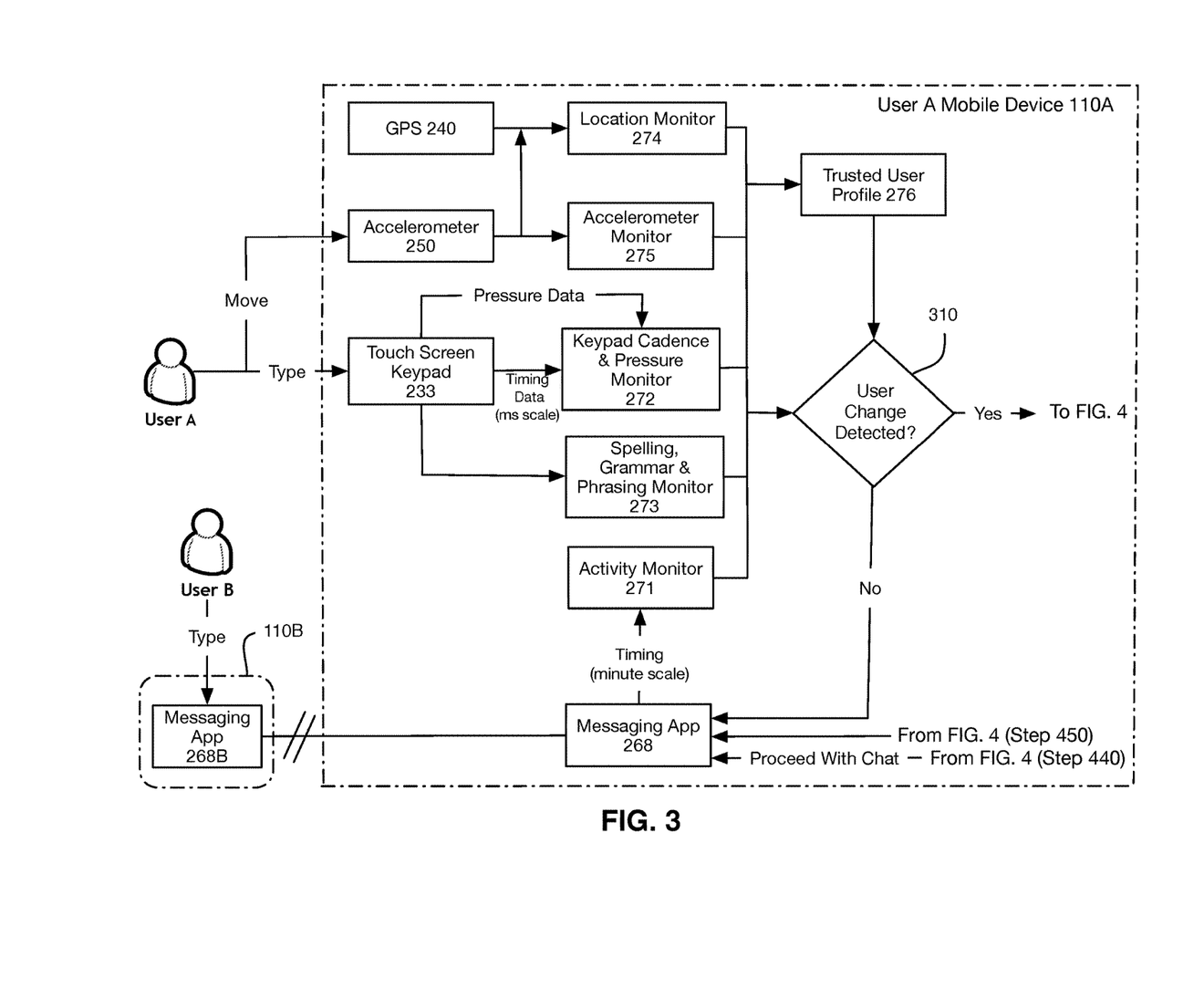
FIG. 3 is an illustrative flow diagram of an example implementation of a continuous authentication tool for mobile device communications.
Figure 4:
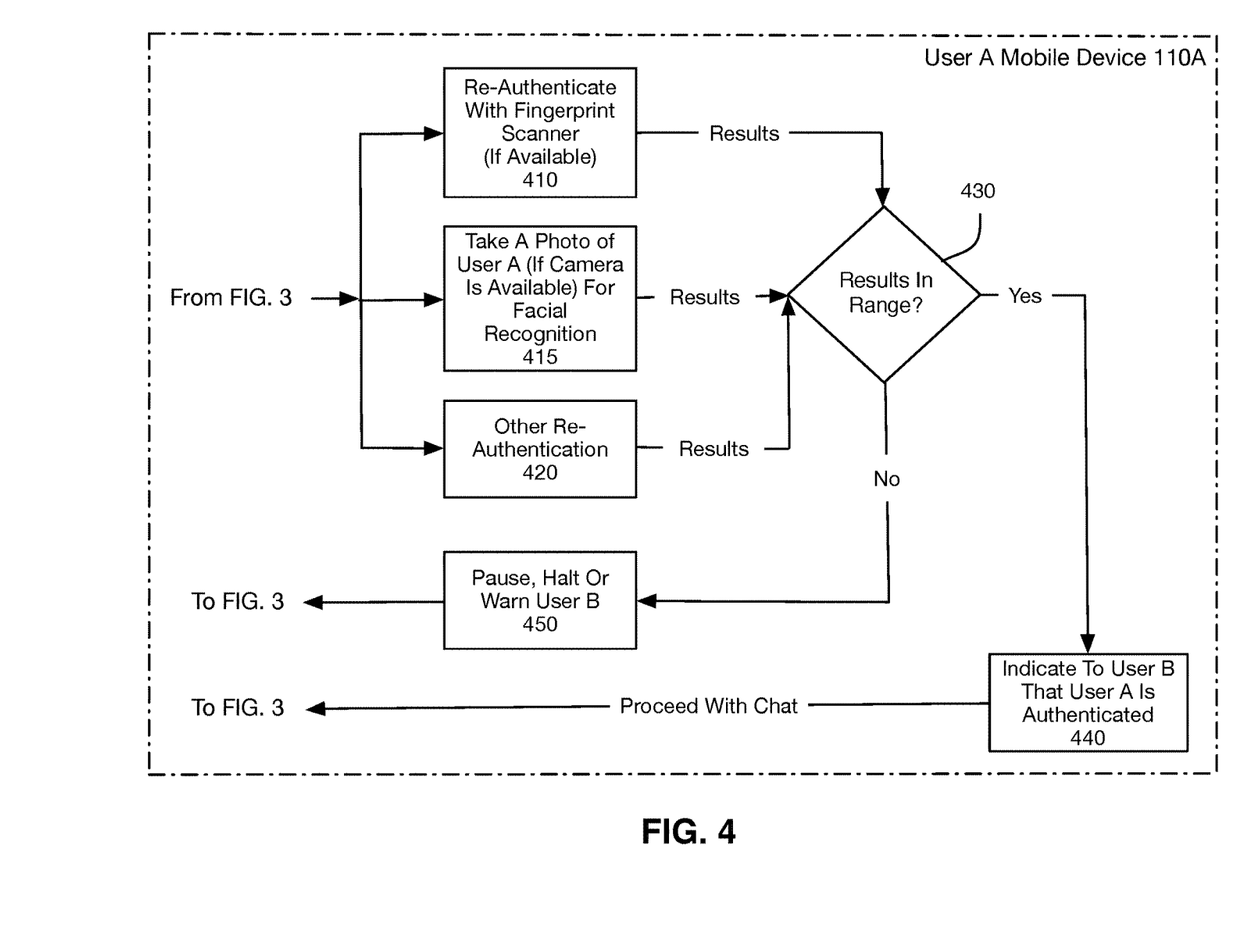
FIG. 4 is a continuation of the illustrative flow diagram of the example implementation of FIG. 3.

FIGS. 3 and 4 are an illustrative flow diagram of an example implementation of a continuous authentication tool for mobile device communications. In this example implementation, User A using mobile device 110A and User B using mobile device 110B are participants in a near real-time electronic communication session (e.g., a SMS text message) over network 120.

In this example implementation, activity monitor 271, keypad cadence and pressure monitor 272, spelling, grammar and phrasing monitor 273, location monitor 274, and accelerometer monitor 275 preferably run in the background on mobile device 110A to continuously monitor the use of mobile device 110A during electronic communication sessions. As discussed above, this data from monitors 271-275 is used to create a trusted user profile 276 relating to the trusted user (e.g., owner) of mobile device 110A, which profile 276 is preferably stored in system memory 260 of mobile device 110A.

Figure 5:
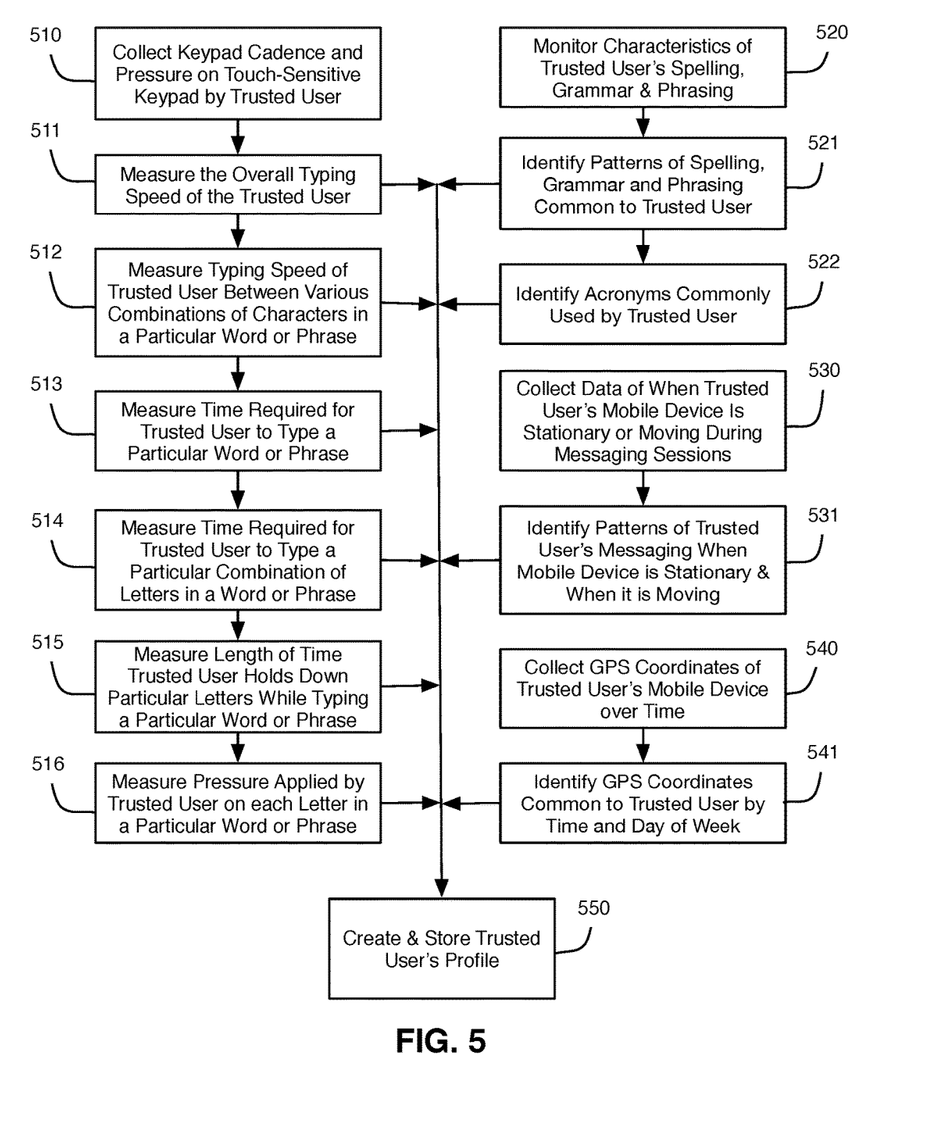
FIG. 5 is an illustrative flowchart showing sequence of steps for creating a trusted user profile for a trusted user of a mobile computing device.

An illustrative sequence of steps for creating the trusted user profile 276 for the trusted user of mobile device 110 is shown in FIG. 5. In Step 510, the keypad cadence and pressure monitor 272 measures the typing rate, characteristics of the typing speed, and key press pressure on the pressure-sensitive touch screen 233 by the trusted user (e.g., owner) of the mobile device 110. This may include (but is not limited to) measuring one or more of the following characteristics of the trusted user: (a) the overall or average typing speed of the trusted user typing on the keypad of the touch-sensitive screen 233 (Step 511); (b) the typing speed of the trusted user between various combinations of characters in a particular word or phrase (Step 512); (c) the time required for the trusted user to type a particular word or phrase on the keypad of the touch-sensitive screen (Step 513); (d) the time required for the trusted user to type a particular combination of letters (or characters) in a word or phrase on the keypad of the touch-sensitive screen (Step 514); (e) the length of time the trusted user holds down or otherwise depresses particular letters (or characters) while typing a particular word or phrase on the keypad of the touch-sensitive screen (Step 515); and/or (f) the pressure applied by the trusted user to depress or otherwise select one or more letters (or characters) while typing a particular word or phrase on the keypad of the touch-sensitive screen (Step 516). Some or all of the data (measurements) collected by the keypad cadence and pressure monitor 272 over time with respect to the trusted user of mobile device 110 is used to identify keypad cadence and pressure characteristics of the trusted user, which are included in the trusted user profile 276 (Step 550).

Similarly, in Step 520, the spelling, grammar and phrasing monitor 273 monitors the text of messages typed by the trusted user of mobile device 110 during electronic communication session. Over time, characteristics or patterns of spelling, grammar and/or phrasing are identified as common to the trusted user of mobile device 110 (Step 521). In addition, acronyms that are commonly used in the trusted user's monitored messages are identified as common to the trusted user (Step 522). These identified characteristics or patterns of the trusted user's spelling, grammar and phrasing are also included in the trusted user profile 276 (Step 550).

In Step 530, the accelerometer monitor 275 determines whether the mobile device 110 is stationary or moving, and collects data of the time of day and/or day of week when the trusted user participates in an electronic communication session on mobile device 110 while the mobile device is stationary and while it is moving. This collected data is used to identify patterns common to the trusted user of the time of day and day of the week when the trusted user participates in electronic communication sessions while the mobile device is stationary or moving. These identified patterns are also included in the trusted user profile 276 (Step 550).

In Step 540, the location monitor 274 captures the GPS coordinates of the mobile device 110, which can be used to identify where the trusted user of the mobile device is normally located at a given time of day and/or day of the week (Step 541). Patterns based on location and time of day and/or day of week are also included in the trusted user profile 276 (Step 550).

In Step 550, the data from one or more of Steps 511-516, 521, 522, 531 and 541 are used to create the trusted user profile 276 associated with the trusted user (e.g., owner) of mobile device 110, which profile 276 is preferably stored in system memory 260 of mobile device 110. It is understood that the data from Steps 510-541 may be collected over time to increase the accuracy of the trusted user profile 276. It is also understood that the sequence or order of Steps 510-541 in FIG. 5 are illustrative and that these steps can be performed simultaneously or in any desired order.

Referring back to FIGS. 3 and 4, once the trusted user profile 276 has been created and stored for the trusted user of mobile device 110A, the decision engine component 277 running in the background on mobile device 110A determines whether the current user (User A) of mobile device 110A is the trusted user of the mobile device. The activity monitor 271, keypad cadence and pressure monitor 272, spelling, grammar and phrasing monitor 273, location monitor 274, and accelerometer monitor 275 running in the background on mobile device 110A continuously monitor the use of mobile device 110A by the current User A during an electronic communication session. Processing unit(s) 200 of mobile device 110A executes the primary decision engine component 277 to compare (in real-time or near real-time) the monitored data associated with the current User A of the mobile device 110A with the stored trusted user profile 276 associated with the trusted user of mobile device 110A. If no change is detected that would be uncharacteristic of the trusted user (Step 310), then the current User A of mobile device 110A is authenticated as the trusted user associated with the mobile device 110 and messaging application 268 running on mobile device 110A allows the electronic communication session to proceed.

In one embodiment, the decision engine component 277 executed by processing unit(s) 200 uses the monitored data from monitors 271-275 to calculate an overall confidence score based on the comparison of the current User A of mobile device 110A to the profile 276 of the trusted user of mobile device 110A. If the overall confidence score is at or above a predefined threshold indicative of the current User A of mobile device 110A being the trusted user of that mobile device, then the electronic communication session is allowed to proceed.

On the other hand, if a change is detected (Step 310) between the monitored data associated with the current User A of mobile device 110A and the stored trusted user profile 280 associated with the trusted user of that mobile device 110A that is uncharacteristic of the trusted user (or below the predefined threshold for the calculated confidence score), then the processing unit(s) 200 cause the mobile device 110A to re-authenticate the current User A as the trusted user of mobile device 110A. Referring to FIG. 4, re-authentication of current User A may be accomplished using, for example, fingerprint recognition, facial recognition, and/or other known authentication techniques including (but not limited to) retina scan, signature recognition, voice recognition, etc. For example, the processing unit(s) 200 in mobile device 110A may require current User A to input a fingerprint using a fingerprint scanner on or connected to mobile device 110A (Step 410), input a photograph of current User A's face using the camera 216 on mobile device 110A (Step 415), and/or provide other re-authentication input (Step 420). It is understood that mobile device 110A could require one or more re-authentication techniques to verify that the current User A is the trusted user of mobile device 110.

The fingerprint, photograph and/or other re-authentication input by the current User A is compared to a previously stored fingerprint, photograph or other re-authentication input of the trusted user, using, for example, fingerprint recognition, facial recognition or other re-authentication modules, to determine whether (or the probability that) the current User A is the trusted user of mobile device 110A (Step 430). If the results of the comparison (Step 430) are within an acceptable range indicative that the current User A is the trusted user, then the messaging application 268 on mobile device 110A allows the electronic communication session to continue. In addition, the mobile device 110A may optionally transmit a message or other indication to mobile device 110B operated by User B over network 120 that User A is authenticated as the trusted user of mobile device 110A (Step 440).

If, however, the results of the comparison (Step 430) are not within an acceptable range indicative that the current User A is the trusted user, then the messaging application 268 on mobile device 110A may pause or halt the electronic communication session and/or transmit a warning message or other indication to mobile device 110B operated by User B over network 120 that User A may not be the trusted user of mobile device 110A (Step 450).

When an incoming message is received by mobile device 110A from mobile device 110B during the electronic communication session, the activity monitor 271 continuously monitors the time elapsed between receipt of the incoming message and the last message transmitted by User A on mobile device 110A to User B on mobile device 110B. If the time elapsed between messages exceeds a predetermined amount of time indicative that the electronic communication session was interrupted, stopped or appeared to be finished, then the activity monitor 271 identifies the received incoming message as having a slightly higher chance that User B is not the trusted user associated with mobile device 110B. This increased risk may be considered by the decision engine component 277 when calculating an overall confidence score regarding whether the User B of mobile device 110B is the trusted user associated with that mobile device.

Figure 6:
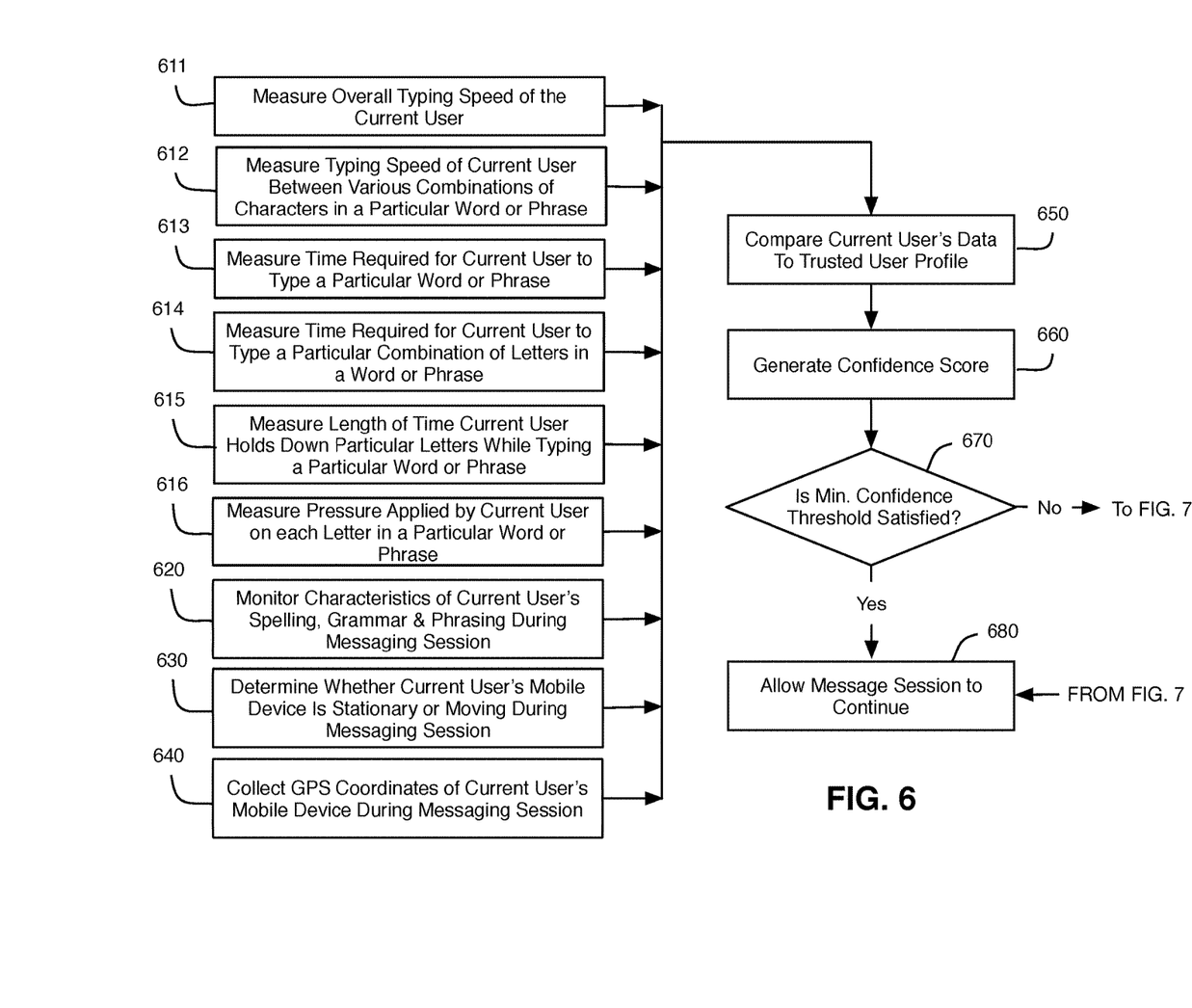
FIG. 6 is an illustrative flowchart showing a preferred sequence of steps for continuously authenticating the identity of a user of a mobile device during an electronic communication session to verify the user of the mobile device as a trusted user.
Figure 7:
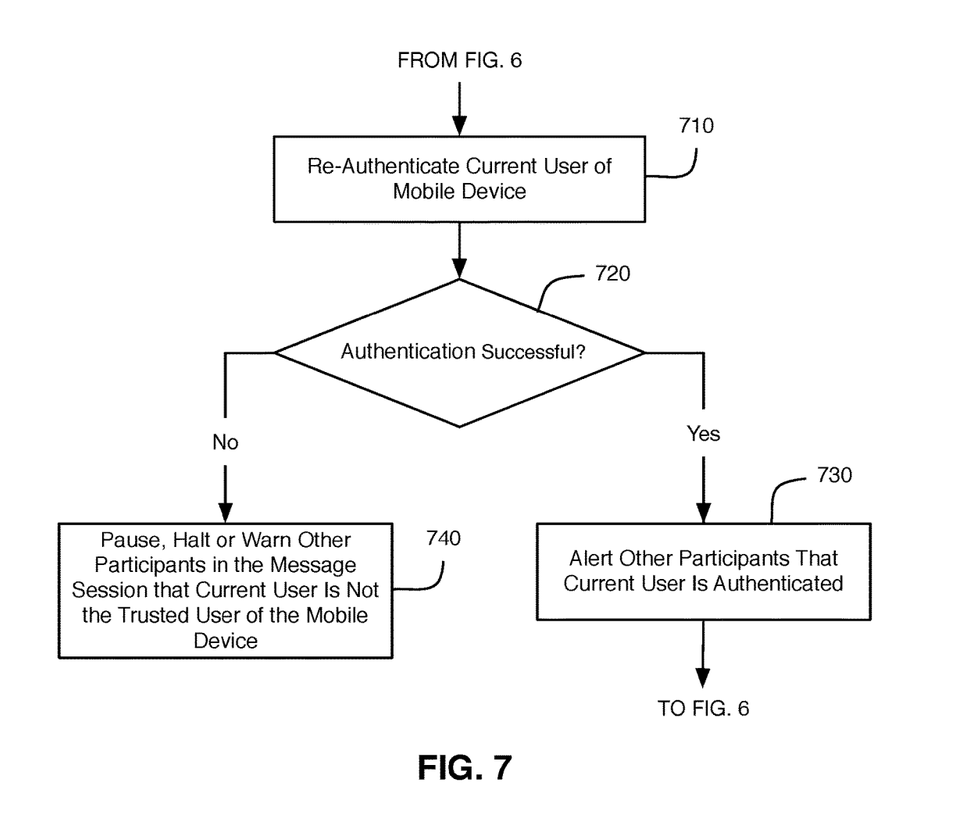
FIG. 7 is a continuation of the illustrative flowchart of FIG. 6.

FIGS. 6 and 7 are illustrative flowcharts showing a preferred sequence of steps for continuously authenticating the identity of a user of a mobile device 110 during a near real-time electronic communication session to verify the user of the mobile device as a trusted user (e.g., the owner of the mobile device).

In Steps 611-616, the keypad cadence and pressure monitor 272 continuously collects real-time keypad cadence and pressure measurements applied to the touch-sensitive screen by the current user of the mobile device 110. This data relating to the current user of the mobile device 110 includes (but is not limited to) at least one or more of the following: (a) the overall or average typing speed of the current user typing on the keypad of the pressure-sensitive touch screen 233 (Step 611); (b) the typing speed of the current user between various combinations of characters in a particular word or phrase (Step 612); (c) the time required for the current user to type a particular word or phrase on the keypad of the touch-sensitive screen (Step 613); (d) the time required for the current user to type a particular combination of letters (or characters) in a word or phrase on the keypad of the touch-sensitive screen (Step 614); (e) the length of time the current user holds down or otherwise depresses particular letters (or characters) while typing a particular word or phrase on the keypad of the touch-sensitive screen (Step 615); and/or (f) the pressure applied by the current user to depress or otherwise select one or more letters (or characters) while typing a particular word or phrase on the keypad of the touch-sensitive screen (Step 616).

In Step 620, the spelling, grammar & phrasing monitor 273 continuously monitors characteristics of the current user's spelling, grammar and phrasing in electronic communications transmitted during the electronic communication session. In Step 630, location monitor 274 continuously monitors the GPS coordinates of the mobile device 110 during the electronic communication session. In Step 640, the accelerometer monitor 275 continuously monitors whether the current user's mobile device 110 is stationary or moving. It is understood that Steps 611-640 may be performed simultaneously and/or in any order.

In Step 650, the decision engine component 277 compares the information obtained in Steps 611-640 to the trusted user profile 276 associated with the trusted user (e.g., owner) of mobile device 110. For example, the decision engine component 277 could compare the real-time measured keypad pressure applied by the current user on one or more keypad characters on the pressure-sensitive touch screen 233 of mobile device 110 to the keypad pressure applied to the corresponding characters by the trusted user (which was previously stored in the trusted user profile 276). If there is an uncharacteristic change in keypad pressure (Step 660), then it is likely that the current user of mobile device 110 is not the trusted user.

In Step 660, the decision engine component 277 generates a confidence score based on the comparison of the current user's data to the trusted user profile 276 (Step 650). The confidence score is representative of the probability that the current user is the trusted user of the mobile device 110. For example, the confidence score may be a value within a predetermined range, such as (but not limited to) between 1 and 10, with "10" indicating the highest confidence probability and "1" indicating the lowest confidence probability.

In Step 670, the confidence score is compared to a minimum confidence threshold, which is a predetermined value marking the minimum acceptable probability that the current user is the trusted user of the mobile device 110. If the generated confidence score satisfies or exceeds the minimum confidence threshold, then the electronic communication session is allowed to continue in Step 680.

If, however, the confidence score is below or otherwise does not satisfy the minimum confidence threshold in Step 670, then the mobile device 110 will require the current user to re-authenticate as the trusted user of that mobile device (Step 710). Re-authentication on mobile device 110 may be accomplished using one or more of fingerprint, facial, retina and/or signature recognition software, or other known biometric and non-biometric re-authentication procedures.

If re-authentication of the current user of mobile device 110 is successful in Step 720, then the other participants using other mobile devices or communication computing devices in the electronic communication session are optionally alerted that the current user of mobile device 110 is authenticated as the trusted user of the device (Step 730). If, however, re-authentication of the current user of mobile device 110 is not successful in Step 720, then the messaging application 268 running on mobile device 110 will cause the electronic communication session to be paused or terminated and/or a warning may be transmitted to the other mobile devices or communication computing devices used by the other participants in the electronic communication session that the current user of mobile device 110 is or may not be the trusted user of that mobile device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A continuous user authentication tool for text-based electronic communications, comprising:
   a mobile computing device associated with a trusted user, the mobile computing device including a pressure-sensitive touch screen coupled to at least one processing unit, wherein the pressure-sensitive touch screen displays a virtual keypad, at least one character of which is depressed by a current user, and wherein the touch screen generates a signal representing keypad pressure applied by the current user when depressing the character;
   a trusted user profile stored in non-transient memory, the trusted user profile including data representing the keypad pressure applied by the trusted user when depressing one or more characters on the virtual keypad, data representing patterns of messaging by the trusted user based on geographic location of the mobile computing device, and data representing word choices of the trusted user during text-based communication;
   a continuous user authentication application, stored in non-transient memory, that, when executed by the at least one processing unit during a current text-based electronic communication session, causes the at least one processing unit to:
   continually monitor keypad pressure applied by the current user of the mobile computing device when depressing characters on the virtual keypad to type an electronic communication during the current text-based electronic communication session,
   compare the monitored keypad pressure applied by the current user when depressing one or more specific characters on the virtual keypad to the trusted user profile data representing the keypad pressure applied by the trusted user to the specific one or more characters,
   continually monitor word choices of the current user of the mobile computing device when using the virtual keypad to type words or acronyms,
   compare the monitored word choices of the current user to the trusted user profile data representing word choices of the trusted user during text-based communication,
   continually monitor the current location of the mobile computing device during the current electronic communication session,
   compare the monitored current location of the mobile computing device to the trusted user profile data representing patterns of messaging by the trusted user based on geographic location of the mobile computing device,
   generate a confidence score based upon the compared keypad pressures, the compared location and compared word choices of the current user and the trusted user, and
   automatically require the mobile computing device to re-authenticate the current user as the trusted user if the generated confidence score is below a predefined minimum confidence threshold that the current user is the trusted user.

2. The continuous user authentication tool of claim 1, wherein the trusted user profile also includes keypad cadence data of the trusted user typing on the virtual keypad, the keypad cadence data including at least one of average typing speed, typing speed between various combinations of characters in a particular word or phrase, length of time required to type a particular word or phrase, length of time required to type a particular combination of characters in a particular word or phrase, and length of time that particular characters are depressed on the virtual keypad while typing a particular word or phrase; and wherein the continuous user authentication application will further cause the at least one processing unit to: continually monitor keypad cadence data of the current user of the mobile computing device as the current user types the electronic communication on the virtual keypad during the current electronic communication session, and compare the monitored keypad cadence data of the current user to keypad cadence data of the trusted user in the trusted user profile; and wherein the generated confidence score is also based upon the compared keypad cadence of the current user and the trusted user of the mobile computing device.

3. The continuous user authentication tool of claim 1, wherein the trusted user profile also includes data representing spelling choices of the trusted user typing on the virtual keypad; and wherein the continuous user authentication application will further cause the at least one processing unit to: continually monitor spelling choices, of the current user of the mobile computing device as the current user types the electronic communication on the virtual keypad during the current electronic communication session, and compare the monitored spelling choices, of the current user to the trusted user profile data representing spelling choices, of the trusted user; and wherein the generated confidence score is also based upon the compared spelling choices, of the current user and the trusted user of the mobile computing device.

4. The continuous user authentication tool of claim 1, wherein the patterns of messaging by the trusted user based on geographic location include the location of the mobile device at a particular time and/or day.

5. The continuous user authentication tool of claim 1, wherein the trusted user profile also includes data representing patterns of messaging by the trusted user when the mobile device is moving and when the mobile device is stationary; and wherein the continuous user authentication application will further cause the at least one processing unit to: continually monitor current acceleration of the mobile device to determine whether the mobile device is moving or stationary during the current electronic communication session, and compare the monitored current acceleration of the mobile device to the trusted user profile data representing patterns of messaging by the trusted user when the mobile device is moving or stationary; and wherein the generated confidence score is also based upon the comparison of the monitored current acceleration of the mobile device to the patterns of messaging by the trusted user when the mobile device is moving or stationary.

6. The continuous user authentication tool of claim 5, wherein the patterns of messaging by the trusted user when the mobile device is moving or stationary include the time and/or day.

7. The continuous user authentication tool of claim 1, further comprising: at least one biometric sensor configured to receive biometric identification data from the current user of mobile computing device, and wherein re-authentication of the current user as the trusted user of the mobile computing device is successful when the received biometric identification data matches biometric identification data of the trusted user stored in non-transitory memory.

8. The continuous user authentication tool of claim 7, wherein the biometric identification data comprises at least one of fingerprint data, face data, voice data, iris data, retina data, and signature data.

9. The continuous user authentication tool of claim 7, wherein, if the re-authentication of the current user is not successful, the continuous user authentication application will further cause the at least one processing unit to perform at least one of: transmit a warning message over a network to computing devices of other participants in the current near real time text-based electronic communication session that the current user is not the trusted user of the mobile computing device; and terminate the current near real time text-based electronic communication session.

10. The continuous user authentication tool of claim 1, wherein the text-based electronic communication is an SMS message, MMS message, EMS message, IM message, or IRC message.

11. A computer-implemented method for continuously authenticating a user of a mobile computing device during a text-based electronic communication session, comprising:
  providing, via a pressure-sensitive touch screen of the mobile computing device, a virtual keypad, at least character of which is depressed by a current user of the mobile computing device;
  storing, using at least one processing unit operatively coupled to non-transient memory, a profile of a trusted user of the mobile computing device in non-transient memory, the trusted user profile including data representing keypad pressure applied by the trusted user when depressing one or more characters on a virtual keypad displayed on a pressure-sensitive touch screen of the mobile computing device, data representing patterns of messaging by the trusted user based on geographic location of the mobile computing device, and data representing word choices of the trusted user during text-based communication;
  continually monitoring, using the at least one processing unit, keypad pressure applied by the current user of the mobile computing device when depressing characters on the virtual keypad to type an electronic communication during the text-based electronic communication session;
  comparing, using the at least one processing unit, the monitored keypad pressure applied by the current user when depressing one or more specific characters on the virtual keypad to the trusted user profile data representing the keypad pressure applied by the trusted user to the specific one or more characters;
  continually monitoring, using the at least one processing unit, the current location of the mobile computing device during the current electronic communication session; and
  comparing, using the at least one processing unit, the monitored current location of the mobile computing device to the trusted user profile data representing patterns of messaging by the trusted user based on geographic location of the mobile computing device,
  continually monitoring, using the at least one processing unit, word choices of the current user of the mobile computing device when using the virtual keypad to type words or acronyms,
  comparing, using the at least one processing unit, the monitored word choices of the current user to the trusted user profile data representing word choices of the trusted user during text-based communication, and
  automatically requiring, using the at least one processing unit, the mobile computing device to re-authenticate the current user as the trusted user if the compared keypad pressures, the compared location, or the compared word choices of the current user and the trusted user do not meet a predetermined minimum confidence threshold that the current user is the trusted user of the mobile computing device.

12. The computer-implemented method of claim 11, further comprising: storing in the trusted user profile, using the at least one processing unit, keypad cadence data of the trusted user typing on the virtual keypad; continually monitoring, using the at least one processing unit, keypad cadence data of the current user of the mobile computing device as the current user types an electronic communication on the virtual keypad during the near real time text-based electronic communication session; and comparing, using the at least one processing unit, the monitored keypad cadence data of the current user to keypad cadence data of the trusted user in the trusted user profile; wherein the keypad cadence data includes at least one of average typing speed, typing speed between various combinations of characters in a particular word or phrase, length of time required to type a particular word or phrase, length of time required to type a particular combination of characters in a particular word or phrase, and length of time that particular characters are depressed on the virtual keypad while typing a particular word or phrase, and wherein the automatically requiring the mobile computing device to re-authenticate the current user as the trusted user occurs if the compared keypad pressures and cadence of the current user and the trusted user are indicative of the likelihood that the current user is not the trusted user of the mobile computing device.

13. The computer-implemented method of claim 11, further comprising: storing in the trusted user profile, using the at least one processing unit, data representing characteristics of spelling choices, grammar and phrasing of the trusted user typing on the virtual keypad; continually monitoring, using the at least one processing unit, characteristics of spelling choices, grammar and phrasing of the current user of the mobile computing device as the current user types an electronic communication on the virtual keypad during the near real time text-based electronic communication session; and comparing, using the at least one processing unit, the monitored characteristics of spelling choices, grammar and phrasing of the current user to the trusted user profile data representing characteristics of spelling choices, grammar and phrasing of the trusted user, wherein the automatically requiring the mobile computing device to re-authenticate the current user as the trusted user occurs if the compared keypad pressures and characteristics of spelling choices, grammar and phrasing of the current user and the trusted user are indicative of the likelihood that the current user is not the trusted user of the mobile computing device.

14. The computer-implemented method of claim 11, further comprising: storing in the trusted user profile, using the at least one processing unit, data representing patterns of messaging by the trusted user when the mobile computing device is moving and when the mobile computing device is stationary; continually monitoring, using the at least one processing unit, current acceleration of the mobile computing device to determine whether the mobile computing device moving or stationary during the current electronic communication session; and comparing, using the at least one processing unit, the monitored current acceleration of the mobile computing device to the trusted user profile data representing patterns of messaging by the trusted user when the mobile computing device is moving or stationary, wherein the automatically requiring the mobile computing device to re-authenticate the current user as the trusted user occurs if the compared keypad pressures and acceleration of the current user and the trusted user are indicative of the likelihood that the current user is not the trusted user of the mobile computing device.

15. The computer-implemented method of claim 11, further comprising: storing in the trusted user profile, using the at least one processing unit, biometric identification data of the trusted user; receiving, from at least one biometric sensor operably coupled to the at least one processing unit, biometric identification data from the current user of the mobile computing device; comparing, using the at least one processing unit, the received biometric identification data of the current user to the biometric identification data of the trusted user stored in the user profile; and re-authenticating, using the at least one processing unit, the current user as the trusted user of the mobile computing device if the received biometric identification data of the current user matches the biometric identification data of the trusted user.

16. The computer-implemented method of claim 15, wherein the biometric identification data comprises at least one of fingerprint data, face data, voice data, iris data, retina data, and signature data.

17. The computer-implemented method of claim 15, wherein, if the received biometric identification data of the current user fails to match the biometric identification data of the trusted user, the method further comprises at least one of: transmitting, using the at least one processing unit, a warning message over a network to computing devices of other participants in the current near real time text-based electronic communication session that the current user is not the trusted user of the mobile computing device; and terminating, using the at least one processing unit, the current near real time text-based electronic communication session.

18. The computer-implemented method of claim 11, wherein the text-based electronic communication is an SMS message, MMS message, EMS message, IM message, or IRC message.

* * * * *